(12) United States Patent
Kato et al.

(10) Patent No.: US 6,862,331 B2
(45) Date of Patent: Mar. 1, 2005

(54) REACTOR CORE COOLING STRUCTURE

(75) Inventors: Yasuyoshi Kato, Tokyo (JP); Yasushi Muto, Tokyo (JP)

(73) Assignee: President of Tokyo Institute of Technology, Tokyo (JP)

(*) Notice: Subject to any disclaimer, the term of this patent is extended or adjusted under 35 U.S.C. 154(b) by 0 days.

(21) Appl. No.: 10/809,703

(22) Filed: Mar. 26, 2004

(65) Prior Publication Data

US 2004/0202274 A1 Oct. 14, 2004

(30) Foreign Application Priority Data

Mar. 27, 2003 (JP) ........................................ 2003-086719

(51) Int. Cl.[7] ............................ G21C 19/28; G21C 3/30
(52) U.S. Cl. ...................................... 376/381; 376/430
(58) Field of Search ................................. 376/381, 382, 376/430, 411, 354, 355, 356

(56) References Cited

U.S. PATENT DOCUMENTS

| 3,287,910 | A | * | 11/1966 | Silverstein | 60/203 |
|---|---|---|---|---|---|
| 3,389,054 | A | * | 6/1968 | Kovacic | 176/32 |
| 3,406,090 | A | * | 10/1968 | Douglas et al. | 176/73 |
| 3,420,738 | A | * | 1/1969 | Grant | 176/72 |
| 3,867,253 | A | * | 2/1975 | Gratton et al. | 176/40 |
| 4,243,487 | A | * | 1/1981 | Schweiger | 176/38 |
| 4,698,203 | A | * | 10/1987 | Ehlers et al. | 376/343 |

FOREIGN PATENT DOCUMENTS

JP  2000-505191  4/2000

* cited by examiner

Primary Examiner—Harvey E. Behrend
(74) Attorney, Agent, or Firm—Squire, Sanders & Dempsey L.L.P.

(57) ABSTRACT

A reactor core cooling structure of the present invention comprises cooling gas flow-in slits for making a cooling gas flow in a circular reactor core, which slits are provided at an outer graphite cylinder for covering an outside of the circular reactor core; cooling gas flow-out slits for making the cooling gas flow in a circular reactor core, which slits are provided at an inner graphite cylinder for covering an inside of the circular reactor core; a circular cooling gas flow path that is provided at an outside of the outer graphite cylinder, and is connected to an inlet piping of the cooling gas at a foot of the outer graphite cylinder; and an inner cooling gas flow path that is provided at an inside of the inner graphite cylinder, and is connected to an outlet piping of the cooling gas at a foot of the inner graphite cylinder.

4 Claims, 6 Drawing Sheets

REACTOR CORE COOLING STRUCTURE

BACKGROUND OF THE INVENTION

1. Field of the Invention

The present invention relates to power generation and heat utilization by an atomic energy, and in particular, to a reactor core cooling structure in a circular reactor core of a pebble bed high temperature gas reactor.

2. Description of the Related Art

A conventional pebble bed high temperature gas reactor is a high temperature gas reactor excellent in safety where a graphite ceramic coating is dispensed to small diametral and spherical nuclear fuel particles such as uranium dioxide in multiple layers, about 15,000 of the particles are collected and mixed with graphite powders and the like, and a spherical fuel (pebble fuel) sintered into a diameter of around 6 cm is used; and can supply a heat energy to a plant and the like by heating up a cooling gas to a high temperature of around 900 degrees Celsius with heat of a reactor core. As the cooling gas, helium or carbon dioxide is used.

Because in such the pebble bed high temperature gas reactor a temperature of the reactor core does not rise not less than 1600 degrees Celsius in any case, and a melting temperature of the graphite covering the fuel is 3,000 degrees Celsius, there is no worry about a melt down of the reactor core, so the reactor is excellent in safety. Therefore, for example, a containment vessel such as in a light water reactor also becomes unnecessary, a structure of a reactor is also simple, materials and parts need not to be custom-made articles for an atomic reactor, and thus articles for thermal power generation may result in being available, thereby a construction cost thereof being able to be markedly suppressed. Accordingly, a design development is progressing, including Japan, in the U.S., France, Germany, Holland, China, South Africa Republic, Russia, and the like.

As a utilization method of heat supplied from the pebble bed high temperature gas reactor, are being progressed studies such as using the heat for power generation with driving a turbine, and utilizing the heat for a thermochemical IS (Iodine-Sulfur) process that is a manufacturing method of hydrogen where a high temperature cooling gas is used.

As an example of such the pebble bed high temperature gas reactor, in claim 1 and FIG. 1 of Japanese Patent Laid-Open Publication No. 2000-505191 (hereinafter simply referred to as the patent document 1) is disclosed a pebble bed high temperature gas reactor where a cooling gas is introduced from a funnel-shaped bottom slant face, thereby fractions of a broken spherical fuel being prevented from clogging at an introduction part of the cooling gas.

In accordance with the pebble bed high temperature gas reactor described in the patent document 1 the cooling gas is designed to flow in a vertical direction toward an upper part of a reactor core from the introduction part of the cooling gas provided on the funnel-shaped bottom slant face.

However, in accordance with the pebble bed high temperature gas reactor described in the patent document 1 there is a problem as follows: When the cooling gas vertically passes through the reactor core as a rising flow, a pressure loss accounts for a large ratio of a total pressure loss, results in a large motive energy loss in carrying the cooling gas, and this results in depressing a heat efficiency of a total system thereof. Accordingly, in the pebble bed high temperature gas reactor it is requested to reduce the pressure loss of the cooling gas for cooling the reactor core.

In addition, although including the pebble bed high temperature gas reactor, the heat efficiency of a high temperature gas reactor becomes higher as a temperature of the cooling gas at an outlet of the high temperature gas reactor is raised, it results in being limited by a heat-resistant temperature of structural materials configuring the high temperature gas reactor. Generally, due to the heat-resistant temperature the temperature of the cooling gas at the outlet of the high temperature gas reactor is set 850 to 950 degrees Celsius. When making the cooling gas flow in from a lateral direction as in the pebble bed high temperature gas reactor of the present invention, an allowable maximum temperature of the cooling gas flowing out from cooling gas flow-out slits is decided by the heat-resistant temperature. However, because the temperature of the cooling gas at the outlet of the high temperature gas reactor becomes an average temperature where the cooling gas flowing out of the cooling gas flow-out slits is mixed, it is requested to make the temperature of the cooling gas flowing out of the cooling gas flow-out slits near the heat-resistant temperature on the whole, in order to heighten the temperature of the cooling gas at the outlet of the high temperature gas reactor till near the heat-resistant temperature. Accordingly, it is further requested to average the cooling gas flowing out of the cooling gas flow-out slits.

SUMMARY OF THE INVENTION

The present invention is found to solve the problems described above and adopts configurations as follows:

A reactor core cooling structure of the present invention comprises cooling gas flow-in slits for making a cooling gas flow in a circular reactor core, which slits are provided at an outer graphite cylinder for covering an outside of the circular reactor core; cooling gas flow-out slits for making the cooling gas flow out of the circular reactor core, which slits are provided at an inner graphite cylinder for covering an inside of the circular reactor core; a circular cooling gas flow path which is provided at an outside of the outer graphite cylinder, and is connected to an inlet piping of the cooling gas at a foot of the outer graphite cylinder; and an inner cooling gas flow path which is provided at an inside of the inner graphite cylinder, and is connected to an outlet piping of the cooling gas at a foot of the inner graphite cylinder.

The reactor core cooling structure of the present invention in accordance with such the configuration enables the cooling gas to be made to flow from the cooling gas flow-in slits to the cooling gas flow-out slits in a horizontal direction, enables a flow path section area to be increased, enables a flow distance within the reactor core to be shortened, and thus enables a pressure loss to be decreased to a large extent.

In addition, matching the characteristic described above, the reactor core cooling structure of the present invention may be a double-circular flow path connected at a top thereof, and after guiding the cooling gas flowing in from the inlet piping till the top through an outer circular gas flow path, the structure may also be designed so as to introduce the cooling gas from the cooling gas flow-in-slits into the circular reactor core while making the cooling gas flow down through an inner circular gas flow path.

The reactor core cooling structure in accordance with such the configuration enables a cooling gas flow amount flowing in from the cooling gas flow-in slits to be increased in a high region of an output density, and thus enables the reactor core to be efficiently cooled.

In addition, matching the characteristic described above, in the reactor core cooling structure of the present invention it is preferable to adjust a ratio of an opening area of the cooling gas flow-in slits, depending on a heat generation distribution in a height direction of the circular reactor core, and to keep a temperature distribution in the height direction of the circular reactor core uniform.

Because the reactor core cooling structure in accordance with such the configuration enables the cooling gas flowing in from the cooling gas flow-in slits to be adjusted in a flow amount thereof, a temperature of the cooling gas flowing out of the cooling gas flow-out slits to be made uniform, it becomes possible to make the temperature of the cooling gas flowing out of the cooling gas flow-out slits rise near till the heat-resistant temperature of structural materials for configuring the high temperature gas reactor.

BRIEF DESCRIPTION OF THE DRAWINGS

FIG. 1A is a vertical section view thereof; and FIG. 1B is a horizontal section view taken along a line X—X of FIG. 1A.

FIG. 3A is a horizontal section view taken along the line X—X of FIG. 3A and; FIG. 3B is a front view of an outer graphite cylinder.

FIG. 4A is a vertical section view thereof; and FIG. 4B is a horizontal section view taken along a line Y—Y of FIG. 4A.

FIG. 5A is a vertical section view thereof; and FIG. 5B is a horizontal section view taken along a line Z—Z of FIG. 5A.

FIG. 6A is a horizontal section view taken along a line X'—X' of FIG. 6B and; FIG. 6B is a front view of an outer graphite cylinder.

DESCRIPTION OF THE PREFERRED EMBODIMENTS

Hereinafter, embodiments of the present invention will be described in detail, referring to appended drawings. However, the present invention is not limited to dimensions, materials, shapes, and relative arrangements of configuration components described in the embodiments unless otherwise specified, and it goes without saying that modifications and changes can be added within the scope of the invention.

Meanwhile, in the embodiments an analysis by simulation described later will be performed for two examples of pebble bed high temperature gas reactors, whose design conditions are a heat output, 400 MW; a cooling gas temperature of an atomic reactor inlet, 300 degrees Celsius; a cooling gas temperature of an atomic reactor outlet, 950 degrees Celsius; and a cooling gas total pressure, 4 MPa, and a conventional pebble bed high temperature gas reactor used for a comparison. In addition, for all of the gas reactors, a shape of circular reactor cores thereof is designed to be cylindrical, that is, 2.25 m in outer radius, 1.35 m in inner radius, and 9.4 m in height.

[First Embodiment]

(a) Description of Equipment Configuration

Figure 1A:
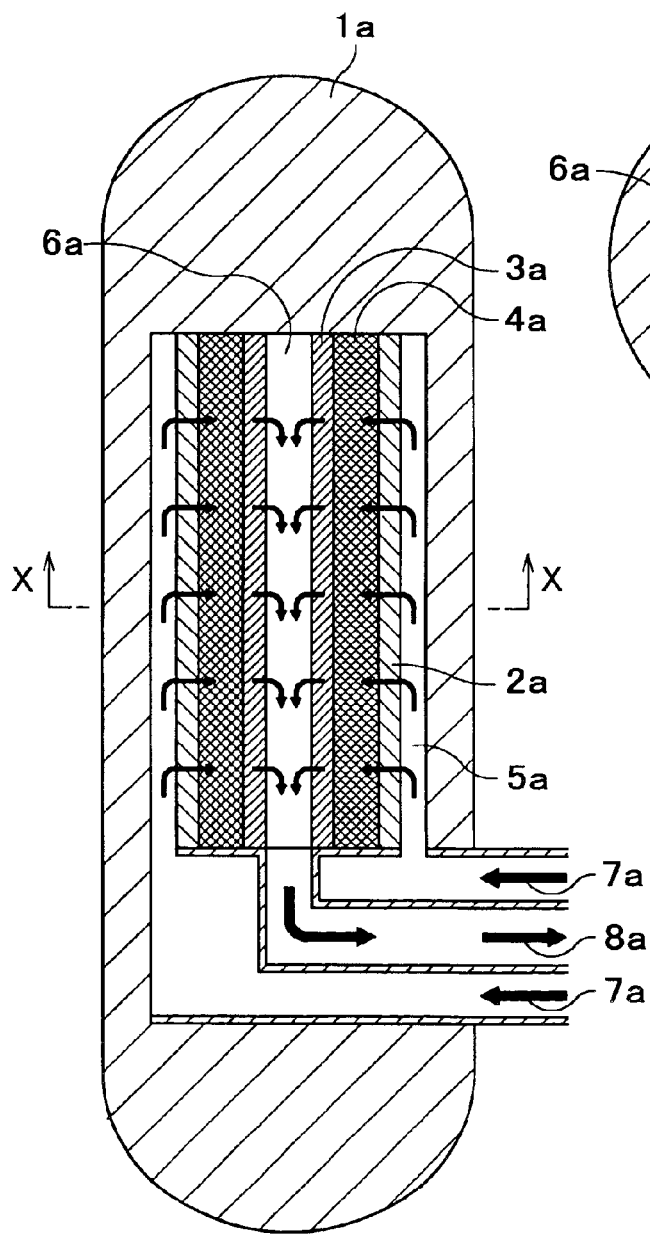
FIGS. 1A and 1B are section views of a pebble bed high temperature gas reactor in a first embodiment.
Figure 1B:
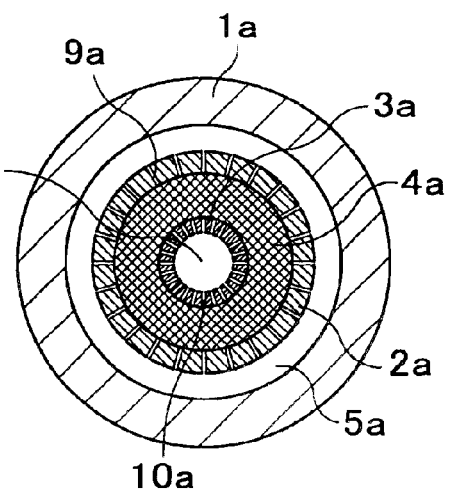

FIGS. 1A and 1B are drawings showing a pebble bed high temperature gas reactor of a first embodiment related to the present invention. First, a configuration of the pebble bed high temperature gas reactor of the embodiment will be described.

The pebble bed high temperature gas reactor shown in FIGS. 1A and 1B is mainly configured of an outer shell pressure vessel 1a made of concrete and the like; an outer graphite cylinder 2a where cooling gas flow-in slits 9a are opened in order to make a cooling gas flow in a fuel filling region 4a described later; an inner graphite cylinder 3a where the cooling gas flow-out slits 10a are opened in order to make the cooling gas flow out of the fuel filling region 4a; the fuel filling region 4a that is partitioned by the outer graphite cylinder 2a and the inner graphite cylinder 3a, and is a circular reactor core of the pebble bed high temperature gas reactor where a spherical fuel (pebble fuel) is cylindrically filled; a circular cooling gas flow path 5a that is a circular space sandwiched between the outer shell pressure vessel 1a and the outer graphite cylinder 2a, and is designed to be a flow path where a flow-in cooling gas flows in from the cooling gas flow-in slits 9a to the fuel filling region 4a while flowing upward; an inner cooling gas flow path 6a that is an inner cylindrical space of the inner graphite cylinder 3a, and is designed to be a flow path where the cooling gas flowing out of the fuel filling region 4a through the cooling gas flow-out slits 10a flows downward; a cooling gas inlet piping 7a connected at a foot of the circular cooling gas flow path 5a; and a cooling gas outlet piping 8a connected at a foot of the inner cooling gas flow path 6a.

In addition, the cooling gas inlet piping 7a and the cooling gas outlet piping 8a are connected to a gas turbine facility, a thermochemical plant, and the like, thereby supplying heat generated in the pebble bed high temperature gas reactor thereto.

Figure 3A:
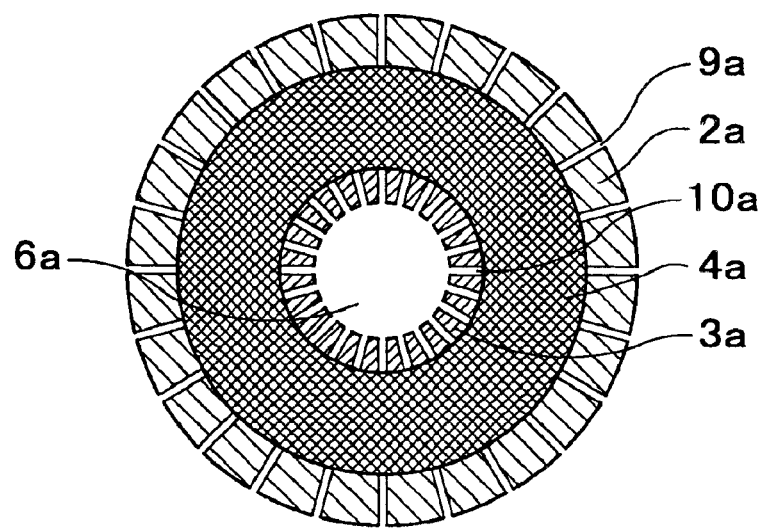
FIGS. 3A and 3B are views illustrating cooling gas flow-in slits and cooling gas flow-out slits in the first embodiment.
Figure 3B:
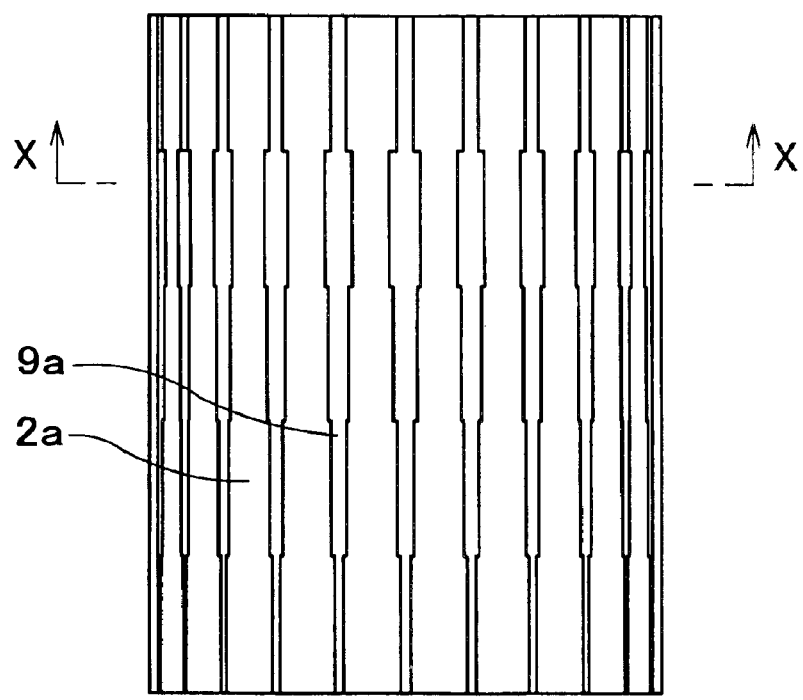

Here, in detail are described shapes of the cooling gas flow-in slits 9a of the outer graphite cylinder 2a and the cooling gas flow-out slits 10a of the inner graphite cylinder 3a. FIGS. 3A and 3B show a horizontal section view of the outer graphite cylinder 2a and a front view thereof. As shown in FIG. 1B, 24 pieces of the cooling gas flow-in slits 9a are provided at a surface of the outer graphite cylinder 2a across an upper part to a lower part thereof. Widths of the cooling gas flow-in slits 9a are decided, depending on height of the outer graphite cylinder 2a, based on a simulation result described later.

In addition, for the inner graphite cylinder 3a the cooling gas flow-out slits 10a, whose widths are changed depending on height of the inner graphite cylinder 3a same as in the cooling gas flow-in slits 9a of the outer graphite cylinder 2a, are provided across an upper part to a lower part of the inner graphite cylinder 3a.

(b) Cooling Gas Flow

Next, a cooling gas flow will be described in detail, referring to FIGS. 1A and 1B (see also FIGS. 3A and 3B). First, a cooling gas having flowed inside the atomic reactor pressure vessel 1a from the cooling gas inlet piping 7a enters in the fuel filling region 4a through the cooling gas flow-in slits 9a provided at the outer graphite cylinder 2a while rising within the circular cooling gas flow path 5a.

Then, the cooling gas having flowed in the fuel filling region 4a through the cooling gas flow-in slits 9a absorbs reaction heat with passing through an air gap of a filled spherical fuel, and being heated up, flows out of the cooling gas flow-out slits 10a to the inner cooling gas flow path 6a. The cooling gas having flowed out to the inner cooling gas flow path 6a flows outside the outer shell pressure vessel 1a from the cooling gas outlet piping 8a connected at the foot of the inner cooling gas flow path 6a, and is supplied as a heat source of the gas turbine and the thermochemical plant not shown.

(c) Calculation of Reduction Effect of Pressure Loss

A pressure loss of the cooling gas passing through the fuel filling region 4a is decided by a flow rate and flow-directional distance of the cooling gas, and is in proportion to a square of the flow rate of the cooling gas, and the flow-directional distance. Here, because the flow rate of the cooling gas is in inverse proportion to an opening area of a slit, the pressure loss of the cooling gas can be said in other words to be in inverse proportion to the square of the opening area of the slit. In the embodiment because an area of the outer graphite cylinder 2a is $2\times2.25$ m$\times\pi\times9.4=133$ m$^2$, and that of the inner graphite cylinder 3a is $2\times1.35$ m$\times\pi\times9.4=80$ m$^2$, a flow path area is 106 m$^2$ in average, the flow-directional distance is a width of the fuel filling region 4a, 2.25 m$-$1.35 m$=$0.9 m.

Figure 5A:
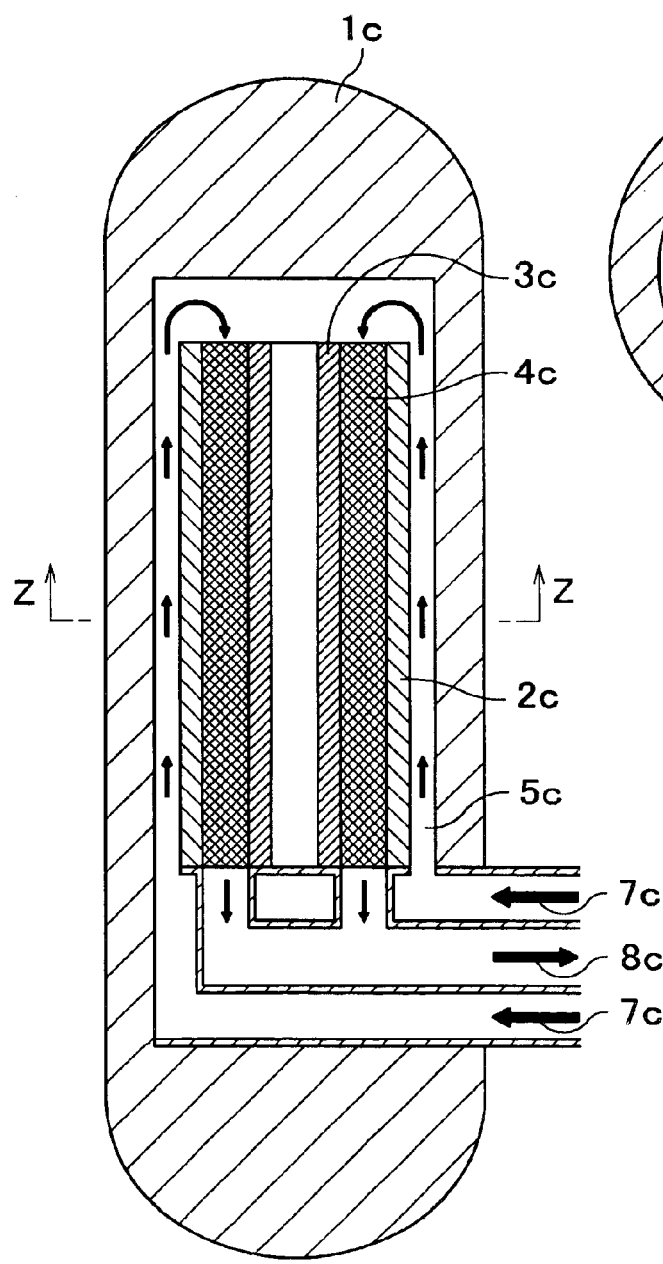
FIGS. 5A and 5B are section views of a conventional pebble bed high temperature gas reactor.
Figure 5B:
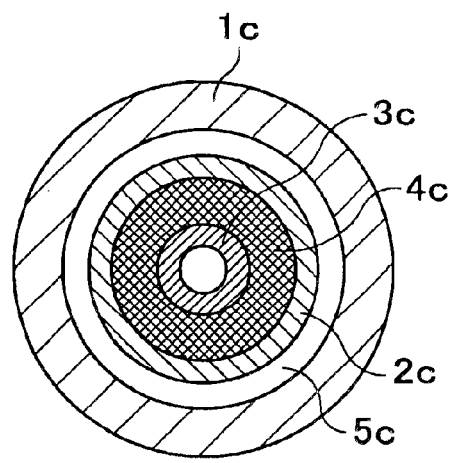

On the other hand, for example, provided that in a pebble bed high temperature gas reactor having a conventional reactor core cooling structure shown in FIGS. 5A and 5B, dimensions of a fuel filling region 4c are 2.25 m in outer radius, 1.35 m in inner radius, and 9.4 m in height, that is, cylindrical, same as the pebble bed high temperature gas reactor of the embodiment shown in FIGS. 1A and 1B, the flow path area is $(2.25$ m$\times2.25$ m$\times\pi)-(1.35$ m$\times1.35$ m$\times\pi)=$ 10.2 m$^2$, and the flow-directional distance is height of the fuel filling region 4c, 9.4 m.

Provided that a filling factor of the pebble fuel is same, a pressure loss of a cooling gas is in proportion to "flow directional distance/square of flow path area"; and therefore, ignoring a proportional constant in comparison of both, the pressure loss of the pebble bed high temperature gas reactor in the embodiment is 0.9 m/(106 m$^2\times$106 m$^2$)=$8\times10^{-5}$, that of the conventional pebble bed high temperature gas reactor shown in FIGS. 5A and 5B is 9.4 m/(10.2 m$^2\times$10.2 m$^2$)= $9\times10^{-2}$. Accordingly, a ratio of the pressure losses becomes 1:1,125, and thus the pebble bed high temperature gas reactor in the embodiment can be expected to reduce the pressure loss till about one thousandth, compared to that of the conventional pebble bed high temperature gas reactor.

(d) Selection of Slit Width

Figure 2:
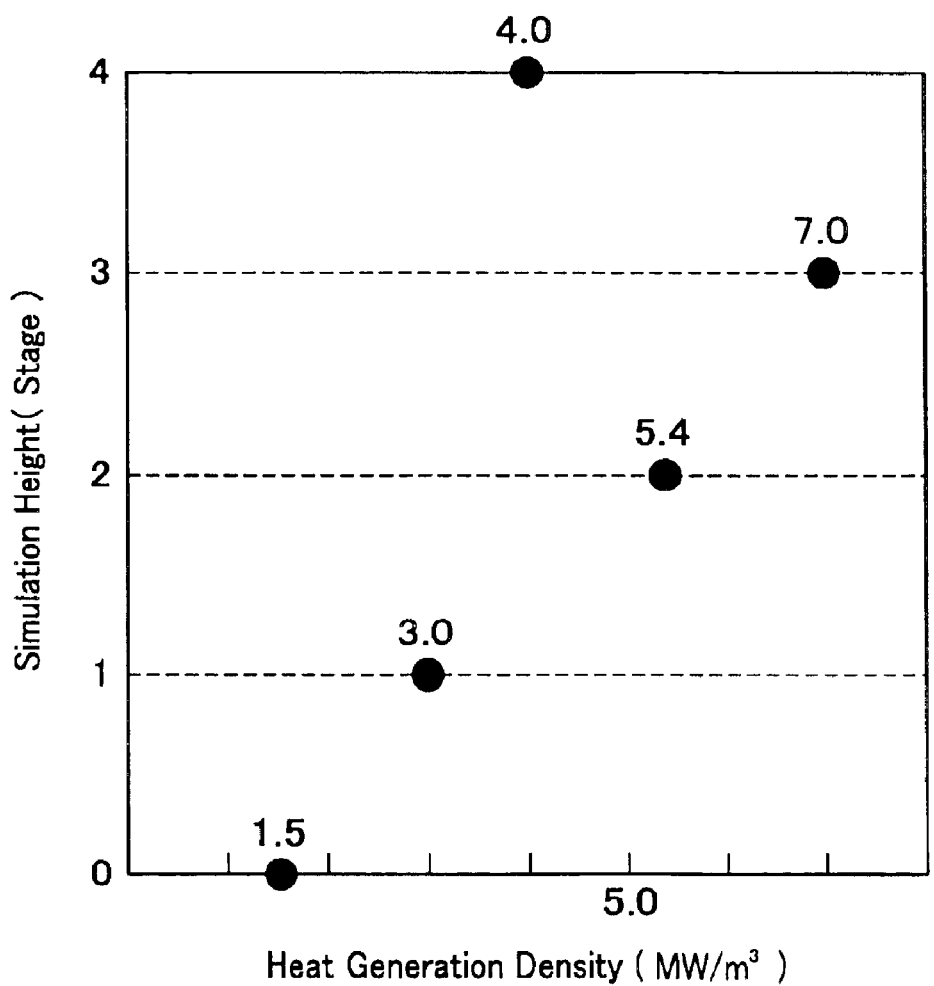
FIG. 2 is a graph showing an output density distribution in a height direction of the pebble bed high temperature gas reactor in the first embodiment.

An output density of the fuel filling region 4a is known to distribute in a height direction, and it is requested to adjust a flow amount of the cooling gas flowing from the cooling gas flow-in slits 9a toward the cooling gas flow-out slits 10a depending on the output density, in order to make a temperature distribution in the cooling gas flow-out slits 10a uniform. As shown in FIG. 2, as a result of having simulated an output density distribution of the reactor core by a two-dimensional heat flowage analysis, the output density distribution have resulted in 4.0 MW/m$^3$, 7.0 MW/m$^3$, 5.4 MW/m$^3$, 3.0 MW/m$^3$, and 1.5 mW/m$^3$ from a top in five stages. Thus, it turns out that in the output density of the fuel filling region 4a a peak exists in height of about one third from the top and the output density becomes small at the top and toward the foot.

As shown in FIGS. 3A and 3B, based on the two-dimensional heat flowage analysis, in the embodiment the outer graphite cylinder 2a is divided into five in a height direction, thus slits are provided, depending on an output density distribution of divided each stage, and in a circumferential direction, 24 pieces of same width slits are designed to be provided at an angle of every 15 degrees. From the top the slit widths are made 5.5 mm, 9.4 mm, 7.1 mm, 4.9 mm, and 3.2 mm.

(e) Result of Simulation

As a result of having performed a simulation analysis of the pebble bed high temperature gas reactor of the embodiment in the above condition, a preferable temperature distribution of the cooling gas have been able to be obtained with a temperature of the cooling gas flowing out of the cooling gas flow-out slits 10a falling between 911 to 981 degrees Celsius.

In addition, the pressure loss in the cooling gas passing through the fuel filling region 4a has resulted in 1.92 kPa. The value is a very small one that is nothing but 0.05% of a total pressure of the cooling gas, 4 MPa. From the result of the simulation analysis, it has turned out that the pressure loss of the cooling gas in the fuel filling region 4a can be reduced to a large extent by setting the slit widths appropriate values while keeping the temperature of the cooling gas almost constant after it passing through the fuel filling region 4a. On the other hand, in the conventional pebble bed high temperature gas reactor where the cooling gas is made to flow out of an upper part to lower part of the fuel filling region 4c, the pressure loss in the fuel filling region 4c is about 400 kPa corresponding to about 10% of the total pressure of the cooling gas, 4 MPa. Accordingly, it has turned out that the reactor core cooling structure of the embodiment enables the pressure loss of the fuel filling region 4a to be reduced till about one two-hundredth compared to that of the conventional pebble bed high temperature gas reactor.

(e) Effect

Thus, because in accordance with the embodiment the pressure loss in the cooling gas passing through the fuel filling region becomes about 0.05% for the total pressure, and in the conventional pebble bed high temperature gas reactor, it is about 10% for the total pressure, the pressure loss can be reduced to about one two-hundredth. In addition, it is known that a ratio, 1%, of the pressure loss for the total pressure contributes about 0.5% in heat efficiency, and the embodiment enables the heat efficiency of the pebble bed high temperature gas reactor to be improved by around 5%.

In addition, when utilizing the cooling gas as a heat source of a thermochemical plant for manufacturing hydrogen, a high temperature of not less than 950 degrees Celsius is requested on one hand, however on the other hand, a pressure of the cooling gas is requested to be lowered for a hydrogen manufacturing reaction. Accordingly, although because in the conventional pebble bed high temperature gas reactor the pressure loss in the cooling gas passing through the circular core is large, it is difficult to utilize the cooling gas as the heat source; because in the pebble bed high temperature gas reactor of the embodiment the pressure loss in the cooling gas passing through the fuel filling region can be suppressed low, an yield of a hydrogen manufacturing can be heightened with arising a reaction speed thereof, thereby an economical efficiency being able to be improved.

In addition, because it is possible to make the distribution temperature of the cooling gas in the cooling gas flow-out slits uniform, the cooling gas of a high temperature near the heat-resistant temperature of the structural materials can be supplied, thereby the heat efficiency being able to be heightened when supplying heat to power generation and a plant.

[Second Embodiment]

Figure 4A:
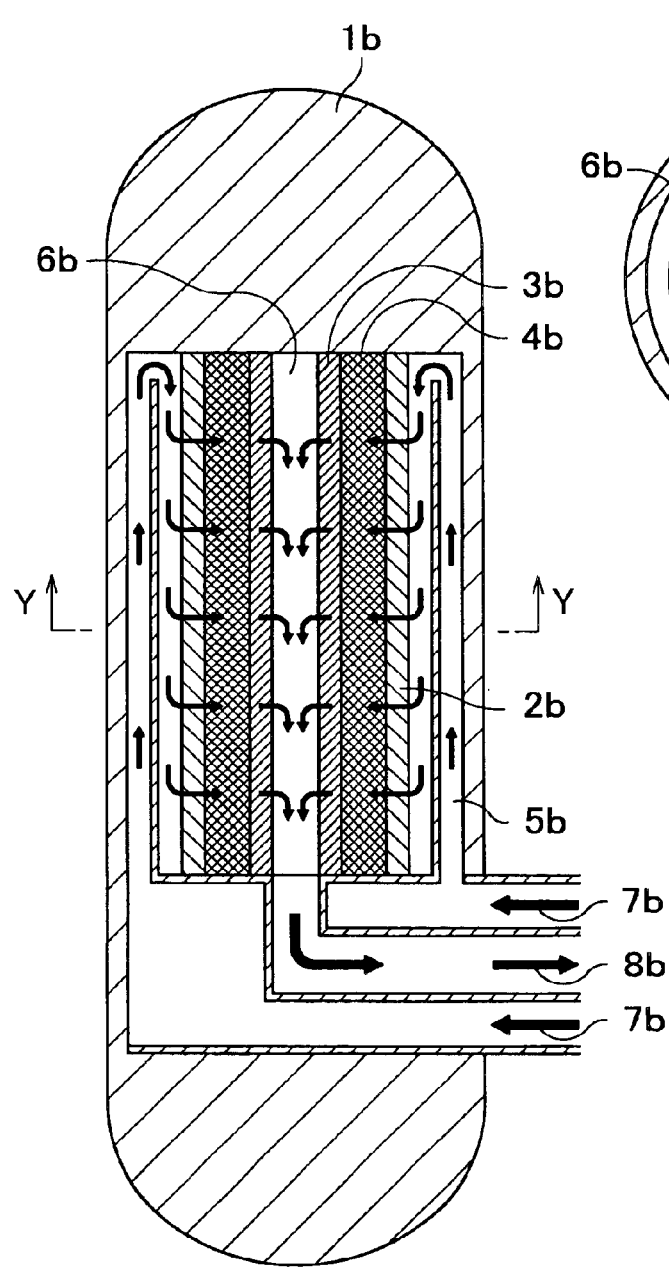
FIGS. 4A and 4B are section views of a pebble bed high temperature gas reactor in a second embodiment.

FIG. 4A is a drawing schematically showing a second embodiment of a pebble bed high temperature gas reactor of a second embodiment related to the present invention. First, a configuration of the pebble bed high temperature gas reactor of the embodiment will be described.

Figure 4B:
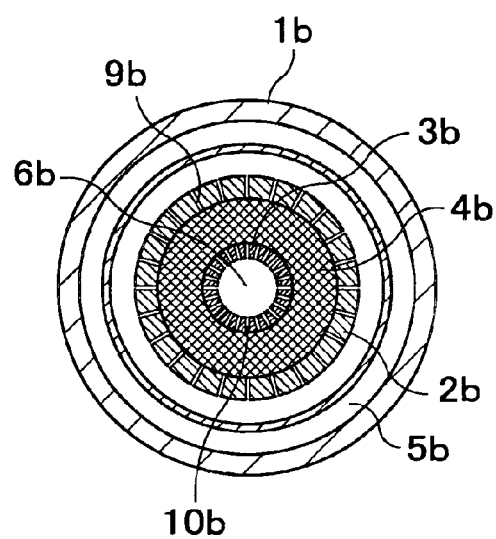

The pebble bed high temperature gas reactor shown in FIGS. 4A and 4B is mainly configured of an outer shell pressure vessel 1b made of concrete and the like; an outer graphite cylinder 2b where cooling gas flow-in slits 9b are opened in order to make a cooling gas flow in a fuel filling region 4b described later; an inner graphite cylinder 3b where cooling gas flow-out slits 10b are opened in order to make the cooling gas flow out of the fuel filling region 4b; the fuel filling region 4b that is partitioned by the outer graphite cylinder 2b and the inner graphite cylinder 3b, and is a circular reactor core of the pebble bed high temperature gas reactor where a spherical fuel (pebble fuel) is cylindrically filled; a circular cooling gas flow path 5b that is a double-circular space sandwiched between the outer shell pressure vessel 1b and the outer graphite cylinder 2b and is connected at a top, and is designed to be a flow path where after the cooling gas once rising till the top it flows in the fuel filling region 4b through the cooling gas flow-in slits 9b while flowing downward with its course being reversed; an inner cooling gas flow path 6b that is an inner cylindrical space of the inner graphite cylinder 3b, and is designed to be a flow path where the cooling gas flowing out of the fuel filling region 4b flows downward; a cooling gas inlet piping 7b connected at a foot of the circular cooling gas flow path 5b of a double pipe; and a cooling gas outlet piping 8b connected at a foot of the inner cooling gas flow path 6b.

In addition, the cooling gas inlet piping 7b and the cooling gas outlet piping 8b are connected to a gas turbine facility, a thermochemical plant, and the like, thereby supplying heat generated in the pebble bed high temperature gas reactor thereto.

(a) Cooling Gas Flow

Next, a cooling gas flow will be described in detail, referring to FIGS. 4A and 4B. The cooling gas having flowed within the outer shell pressure vessel 1b from the cooling gas inlet piping 7b once rises in an outer flow path of the circular cooling gas flow path 5b enters in the fuel filling region 4b through the cooling gas flow-in slits 9b provided at the outer graphite cylinder 2b while coming down an inner flow path of the circular cooling gas flow path 5b with its course being reversed. The cooling gas, which has absorbed reaction heat while passing through an air gap of a spherical fuel in the fuel filling region 4b and has flowed out of the cooling gas flow-out slits 10b provided at the inner graphite cylinder 3b with being heated up, flows in the inner cooling gas flow path 6b, is collected while coming down, and results in being supplied as a heat source of a gas turbine and a thermochemical plant not shown.

Although in the embodiment the slit widths of the cooling gas flow-in slits 9b and the cooling gas flow-out slits 10b are different from those of the first embodiment, a temperature of the cooling gas flowing out of the cooling gas flow-out slits 10b can be similarly kept almost constant in a height direction; and for the conventional pebble bed high temperature gas reactor shown in FIGS. 5A and 5B, the pressure loss can be reduced to a large extent same as in the first embodiment. Although compared to the first embodiment, the circular cooling gas flow path 5b is newly requested to be made double, a distance from the circular cooling gas flow path 5b to an upper part of the reactor core where an output density is higher is shorter, compared to that of the first embodiment. Accordingly, the pressure of the cooling gas at the upper part of the reactor core can be kept higher, thereby a needed flow amount can be ensured with narrower slit widths compared to those of the first embodiment.

(b) Effect

Thus, because in accordance with the embodiment, in combination with the effect of the first embodiment the pressure of the cooling gas is higher at the upper part of the reactor core where the output density is larger and thereby the needed flow amount can be ensured even with the narrower slit widths, the cooling gas can be efficiently supplied and a setting of the slit widths becomes easier.

Meanwhile, although for the simulation, in the first and second embodiments are described examples of making the temperature of the cooling gases flowing out of the fuel filling regions to the inner cooling gas flow paths uniform by comprising five stages of the cooling gas flow-in slits and the cooling gas flow-out slits and adjusting opening lengths in a height direction thereof, the present invention is not limited to a number and shape of these slits; for example, the shape of the slits can also be changed to a same diameter of punch holes whose number and diameter are adjusted, depending on height of the slits.

Figure 6A:
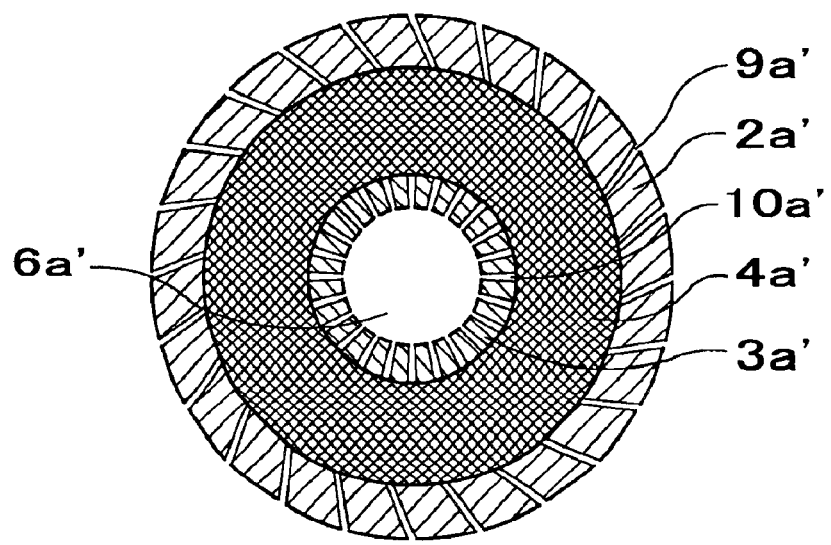
FIGS. 6A and 6B are views illustrating cooling gas flow-in slits provided with angles being made in reactor core directions of a pebble bed high temperature gas reactor of the present invention.
Figure 6B:
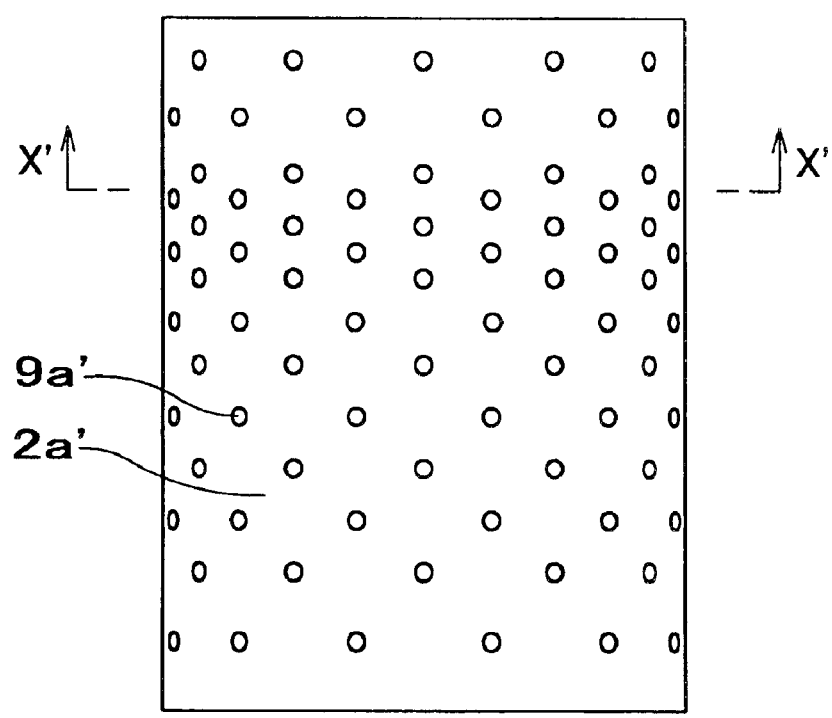

In addition, although in the embodiments the slits of the graphite cylinders are designed to be radially opened from a center of the reactor core, the slits may also be designed to be opened in deviated directions from the center of the reactor core so that the cooling gas spirally flows in the reactor core. A configuration of such an outer graphite cylinder, an inner graphite cylinder, and a fuel filling region is shown in FIGS. 6A and 6B. Referring to FIGS. 6A and 6B, cooling gas flow-in penetration holes 10a' provided at an outer graphite cylinder 2a' can supply a cooling gas to a fuel filling region 4a' with making a constant angle from a center of a high temperature gas reactor. In addition, openings are designed to be a same diameter of punch holes, and a density of the holes becomes densest in height of one third from a top.

What is claimed is:

1. A reactor core cooling structure that has a circular reactor core filled with a spherical fuel, and is applied to a pebble bed high temperature gas reactor for carrying reaction heat of said circular reactor core by a cooling gas consisting of any of helium and carbon dioxide, the structure comprising:

cooling gas flow-in slits for making said cooling gas flow in said circular reactor core, which slits are provided at an outer graphite cylinder for covering an outside of said circular reactor core;

cooling gas flow-out slits for making said cooling gas flow out from said circular reactor core, which slits are provided at an inner graphite cylinder for covering an inside of said circular reactor core;

a circular cooling gas flow path that is provided at an outside of said outer graphite cylinder, and is connected to an inlet piping of said cooling gas at a foot of the outer graphite cylinder; and an inner cooling gas flow path that is provided at an inside of said inner graphite cylinder, and is connected to an outlet piping of said cooling gas at a foot of the inner graphite cylinder.

2. The reactor core cooling structure according to claim 1, wherein said circular cooling gas flow path is a double-circular flow path connected at a top thereof, and wherein after guiding said cooling gas flowing from said inlet piping till the top through an outer circular gas flow path, the circular cooling gas flow path introduces the cooling gas from said cooling gas flow-in-slits to said circular reactor core, while making the cooling gas flow down through an inner circular gas flow path.

3. The reactor core cooling structure according to claim 1, wherein depending on an output density distribution of said circular reactor core in a height direction, a ratio of an opening area of said cooling gas flow-in slits is adjusted, based on height of said circular reactor core, whereby a cooling gas temperature distribution of said cooling gas flow-out slits is kept uniform in the height direction of said circular reactor core.

4. The reactor core cooling structure according to claim 2, wherein depending on an output density distribution of said circular reactor core in a height direction, a ratio of an opening area of said cooling gas flow-in slits is adjusted, based on height of said circular reactor core, whereby a cooling gas temperature distribution of said cooling gas flow-out slits is kept uniform in the height direction of said circular reactor core.

* * * * *